July 29, 1947. A. J. BLUM 2,424,792
COOLING APPARATUS
Filed Feb. 14, 1944 3 Sheets-Sheet 1
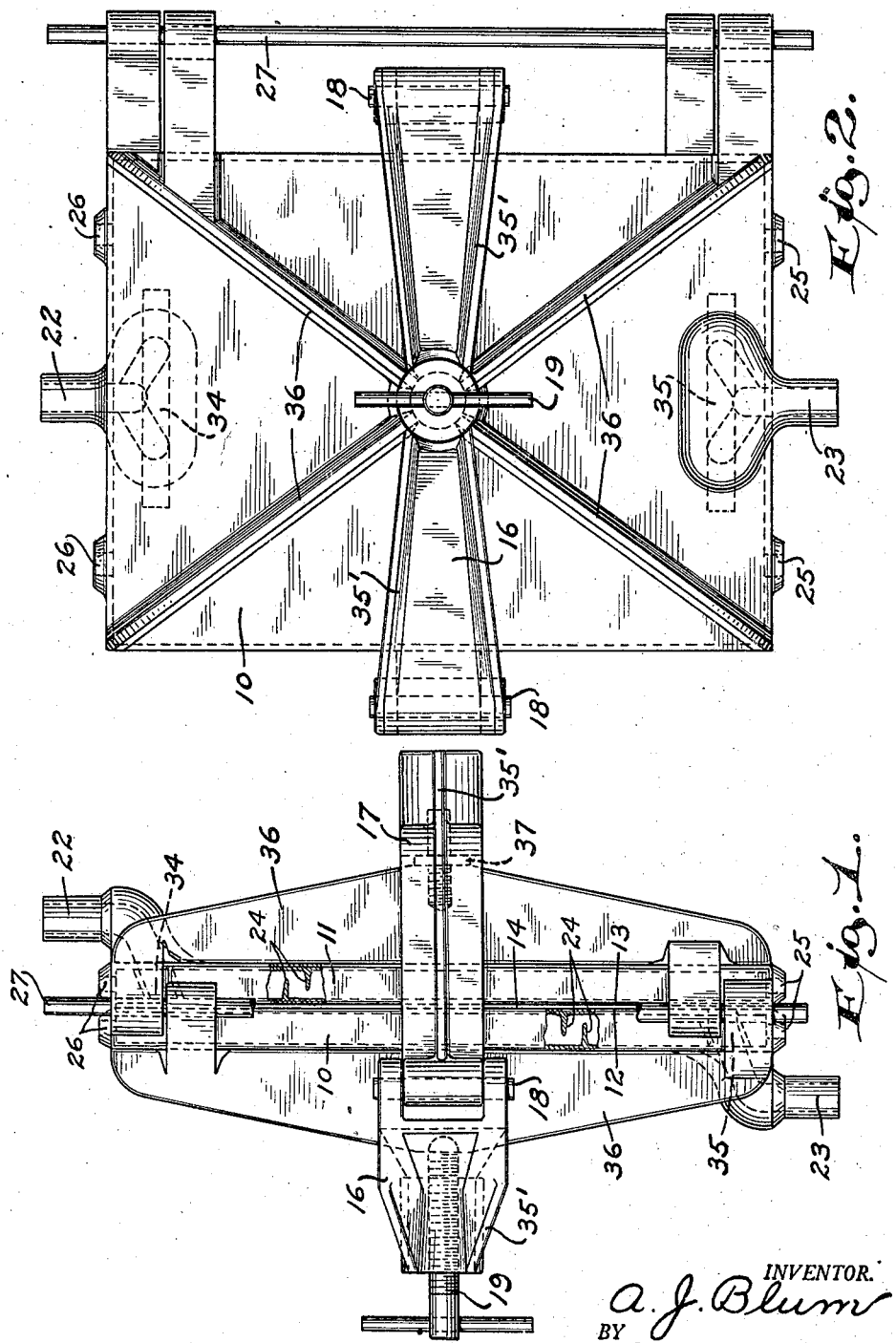
INVENTOR.
A. J. Blum
BY
Lieber & Lieber
ATTORNEYS

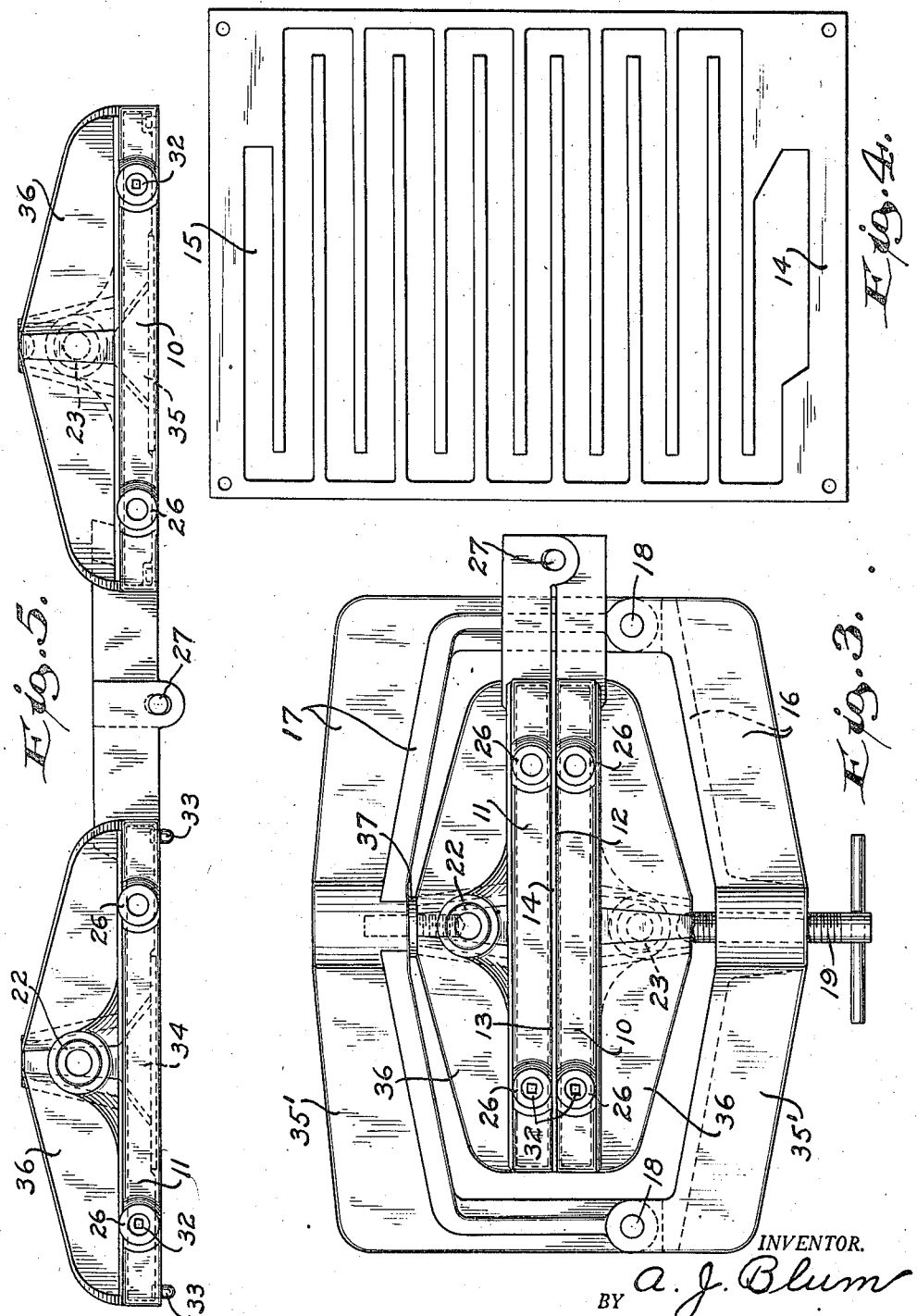

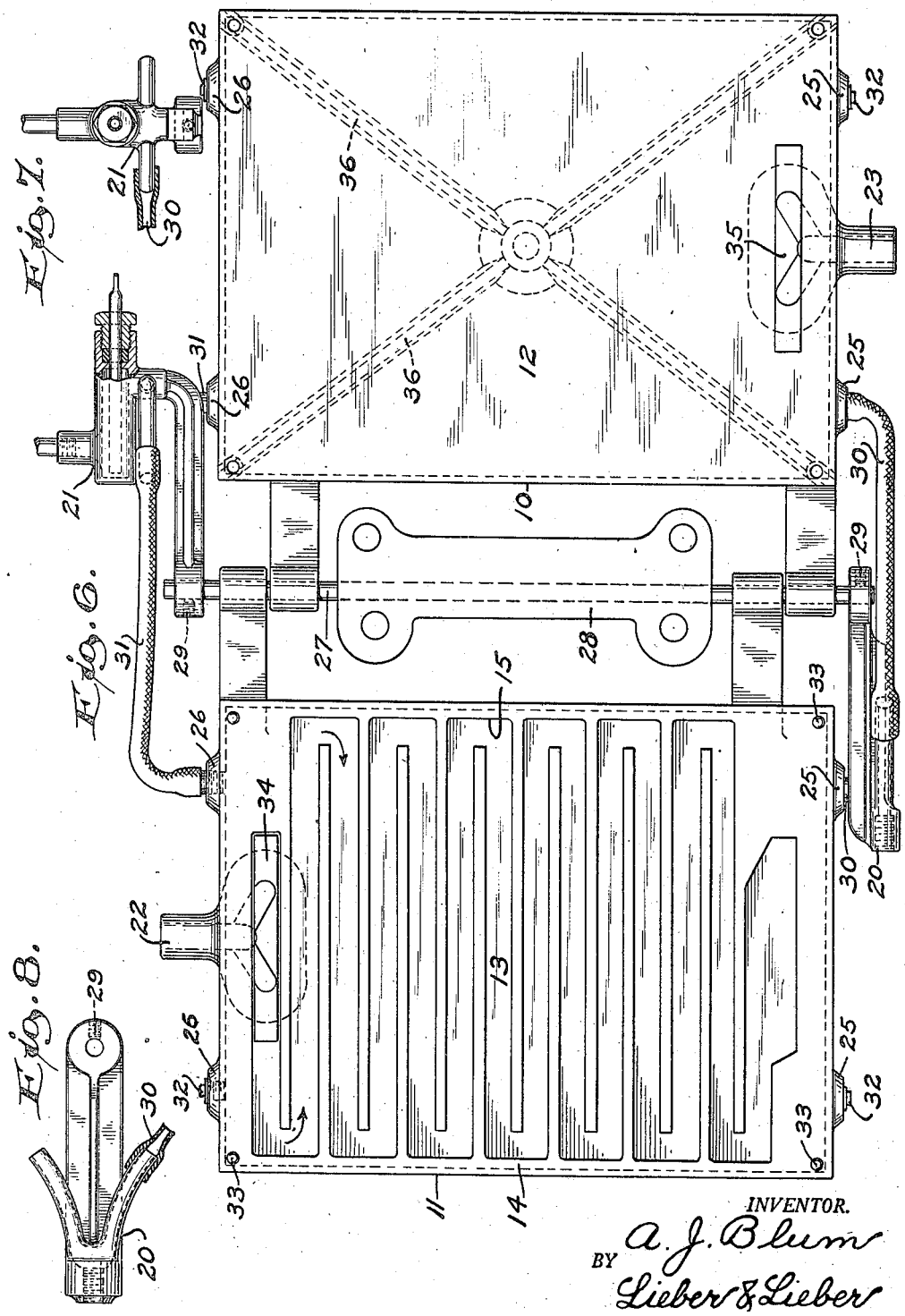

Patented July 29, 1947

2,424,792

UNITED STATES PATENT OFFICE 2,424,792

COOLING APPARATUS

Albert J. Blum, Maplewood, N. J., assignor to Mt. Vernon Farm Dairy, Pittstown, N. J., a partnership comprising John F. Montgomery and Albert J. Blum Application February 14, 1944, Serial No. 522,313

3 Claims. (Cl. 257—245)

The present invention relates in general to improvements in the art of treating commodity such as cows' milk, and relates more specifically to an improved apparatus for cooling cows' milk or the like.

The primary object of my invention is to provide an improved cooler for quickly and effectively cooling milk promptly after extraction thereof from the cows, and with minimum exposure to the atmosphere.

Another important object of the invention is to provide improved apparatus for cooling liquids most efficiently and economically, and which is especially useful for cooling milk immediately upon removal thereof from the cows.

It is desirable when milking cows or the like, to cool the milk from its normal extraction temperature of approximately 98° F. to a temperature of approximately 38° F., as quickly as possible after removal of the milk from the animals, and it is also desirable to effect such cooling before the milk has been exposed to the ambient atmosphere for a prolonged period of time since warm milk has a tendency to quickly increase in bacteria count. While moderately rapid cooling of milk following its extraction from the cows, has heretofore been effected by various batch methods, these prior methods were relatively slow and cumbersome and did not prevent undesirable exposure of the warm milk to the surrounding air. The prior cooling methods were therefore relatively unsatisfactory both because of the difficulties of performance, and also because of their unsanitary nature, but they are still in universal use due to the lack of better and more efficient methods of and apparatus for treating the commodity.

It is therefore a more specific object of this invention to provide new and useful apparatus for rapidly and efficiently cooling a substantially continuous stream of cows' milk immediately upon extraction thereof from the animals, and before the milk has been exposed to the outside air.

Another specific object of my invention is to provide a very simple portable cooler for cooling milk in an expeditious and sanitary manner.

A further specific object of the present invention is to provide an improved apparatus for effecting quick cooling of cows' milk or the like with the aid of standard automatic milking machines operating upon one or more cows.

Still another specific object of this invention is to provide simple and compact cooling apparatus of sufficient capacity to handle a continuous flow of milk of considerable volume, and which is portable and adapted for convenient disposition near the source of warm milk supply.

An additional specific object of my invention is to provide an improved milk cooler which is operable with minimum attention, which may be readily maintained in highly sanitary condition, and which may be manufactured and operated at moderate cost.

These and other specific objects and advantages of the present invention will be apparent from the following detailed description.

A clear conception of the several features of my new milk cooling apparatus, and of the construction and operation of the improved portable cooler, may be had by referring to the drawings accompanying and forming a part of this specification wherein like reference characters designate the same or similar parts in the various views.

Fig. 1 is a rear view of the improved milk cooler, showing the same in closed condition ready for normal use, and portions thereof having been broken away in order to reveal normally concealed parts;

Fig. 2 is a side elevation of the milk cooler, looking toward the left side of Fig. 1 and also showing the assemblage ready for normal use;

Fig. 3 is a top view of the cooler shown in Figs. 1 and 2, likewise showing the apparatus ready for normal use;

Fig. 4 is a plan view of one of the improved milk conduit forming grids used in the milk cooler;

Fig. 5 is a top view of the improved cooling sections or plates in open position, and with the clamp and grid omitted;

Fig. 6 is a front view of the cooling sections or plates likewise in open position and with the clamp removed, but showing the grid in place;

Fig. 7 is an end view of the upper refrigerant suction connection or fitting; and Fig. 8 is a top view of the lower refrigerant connection or fitting.

While the invention has been described herein as being especially and advantageously applicable for the purpose of cooling cows' milk in a continuous manner and immediately following removal of the milk from the animals, it is not my desire or intention to unnecessarily limit the utility of the improvement by virtue of this restricted disclosure.

In accordance with my improved milk cooling system, I subject the milk to cooling promptly after removal thereof from the cows and before prolonged exposure of the milk to the ambient atmosphere or outside air. It is preferable in carrying on my improved method to cool the milk artificially and continuously, and to reduce the temperature from a normal of approximately 98° F. at the time of removal from the animals, to a final temperature of about 38° F. This reduction may be readily effected at a rate of approximately twenty pounds every five minutes, which is about the average yield of two cows. The continuity of the improved cooling system may be readily obtained, by utilizing a standard milking machine, which will also eliminate undesirable exposure of the warm milk to impure air; but the rapidity and uniformity of cooling is preferably effected by utilizing an improved cooler which is especially adapted to expedite practical exploitation of the improved cooling system. The use of a milking machine in conjunction with my cooling system, will also eliminate the utilization of milk strainers, and the system may be advantageously employed by large as well as smaller operators, and in relatively cramped quarters.

The special cooling apparatus shown in the drawings, and which is especially adapted for use in carrying on my improved milk cooling system, comprises in general a pair of hingedly connected hollow cooling sections or plates 10, 11 having smooth and flat surfaces 12, 13 respectively, normally facing each other; a flat grid 14 having a circuitous cut-out forming an elongated milk conducting conduit 15, the grid 14 normally being confined between the plate surfaces 12, 13; a detachable clamp consisting of two clamping sections 16, 17 connected by removable pins 18 and normally coacting with the plates 10, 11 respectively, and a clamping screw 19 interposed between the plate 10 and section 16; lower and upper special removable and adjustable fittings 20, 21 respectively, for conducting refrigerant to and from the cooling plates 10, 11; and milk supply and discharge conduits 22, 23 respectively extending through the respective plates 11, 10, and communicating with the upper and lower ends of the conduit 15.

The cooling plates 10, 11 may be of similar construction, formed of aluminum or other light material, and the hollow interior of each of these plates may be provided with a series of baffle fins 24, as shown in Fig. 1, for the purpose of preventing free escape of refrigerant such as methyl chloride, and for augmenting the heat transfer qualities of the plates. In addition to the fins 24, the interiors of the hollow plates 10, 11 may also be provided with some of the refrigerant during transfer of the unit from one set of cattle to another, thus avoiding undesirable heating of the plates during such periods. Each of the plates 10, 11 is also provided with a pair of laterally spaced lower internally threaded bosses 25, and with a similar pair of laterally spaced upper bosses 26; and the two plates 10, 11 are moreover hingedly interconnected by means of a pivot rod 27 which permits these plates to be swung toward and away from each other, and also coacts with a suspension bracket 28 for supporting the entire unit from a wall or post, see Fig. 6.

The lower refrigerant supply fitting 20 is adjustably and detachably secured to the lower end of the pivot rod 27 by means of a set screw 29, and has two supply branches each of which is normally connected by a flexible hose 30 with the lower interior of one of the hollow plates 10, 11 through either of the lower bosses 25 thereof; and the upper refrigerant discharge fitting 21 is likewise adjustably secured to the upper end of the pivot rod 27 by means of another set screw 29, and also has two branches each of which normally communicates through a flexible hose 31 with the upper interior of one of the hollow cooling plates through either boss 26 thereof. The unused bosses 25, 26 may be sealed by pipe plugs 32 which may be removed to effect flushing and cleaning of the cooling chambers; and the refrigeration system should also be provided with a suitable compressor for the refrigerant, the suction side of which communicates with the upper fitting 21 and the discharge side of which is connected through a condenser to the lower fitting 20.

The grid 14 within which the elongated milk conducting conduit 15 is formed, and which is shown in detail in Figs. 4 and 6, may be stamped from suitable metal of any desired thickness dependent upon the desired capacity of the cooling unit; and this intervening plate or grid 14 may be held in proper position with respect to the plate surfaces 12, 13, by means of dowel pins 33. The upper warm milk supply conduit 22 of the cooling plate 11 may be provided with a milk supply hopper having a suitable closure cover, but is preferably connected directly to the outlet of a standard milking machine by means of a sealed flexible sanitary tube, so as to eliminate exposure of the milk to the ambient atmosphere from the time it is taken from the cows until after it has been cooled; and the lower cool milk discharge conduit 23 may likewise be provided with a tight fitting flexible sanitary tube through which the cold milk may be drained into suitable receptacles. The upper conduit 22 has a laterally widened delivery portion 34 communicating with the uppermost part of the circuitous milk passage or conduit 15, and the lower conduit 23 may likewise be provided with a laterally widened cold milk receiving portion 35 which communicates with the lowermost part of the conduit 15, see Figs. 2 and 6.

In order to prevent possible escape of milk from or ingress of air to the conduit 15, or by-passing of the milk, the cooling plates 10, 11 must be firmly clamped against the intervening grid 14, but the clamp should also be readily removable to permit inspection and thorough cleaning of the grid 14 and plate surfaces 12, 13. The clamp sections 16, 17 should therefore be made relatively strong and are re-enforced by stiffening ribs 35'; and the cooling plates 10, 11 are also provided with diagonal external stiffening ribs 36 for preventing possible distortion thereof. The clamping screw 19 is adapted to coact with a central socket formed at the intersection of the ribs 36 of the plate 10, and a clamp retaining stud 37 may also be provided having one end screw threaded into the intersecting ribs 36 of the plate 11 while its opposite end may be caused to coact with a bore in the clamp section 17, as shown in Figs. 1 and 3. With the aid of such a clamp assemblage, the cooling plates 10, 11 may be forced into firm coaction with the intervening grid 14, as in Figs. 1, 2 and 3, but the clamp may also be readily removed so as to permit the plates 10, 11 to be swung apart, as in Figs. 5 and 6. Since the set screws 29 permit ready adjustment of the fittings 20, 21 about or along the pivot rod 27, these fittings may be adjusted to various positions, and the flexible hoses 30, 31 will permit the plates 10, 11 to be swung in either direction without interference. The cooler supporting bracket 28 may be bolted to a wall or port, or it may be detachably applied to suspension hooks, and this bracket may be of any desired formation.

During normal operation of the improved cooler, a grid 14 of suitable thickness should be firmly clamped between the cooling plates 10, 11 with the aid of the clamp sections 16, 17 and screw 19, and refrigerant such as methyl chloride should be circulated through the interiors of the hollow plates 10, 11. A continuous stream of warm milk should then be introduced into the cooler directly from the cows and before exposure thereof to the outside air, through the upper inlet connection 22 and delivery portion 34, and as the stream of warm milk enters the elongated conduit 15 it is flattened and flows in relatively thin film formation throughout the conduit and in contact with the cold surfaces 12, 13 of the plates 10, 11. The milk is thus quickly and continuously, but rather gradually and uniformly cooled as it flows by gravity through the circuitous and elongated conduit 15, and is eventually discharged from the cooler through the lower discharge conduit 23. In this manner my improved milk cooling system may be carried on continuously and effectively, and when the cooler is associated directly with the discharge line of a standard milking machine, undesirable exposure of the warm milk to the ambient atmosphere may be readily avoided.

The cooling unit by virtue of its light weight and portability, may be readily moved from place to place, and it can also be easily opened or dismantled for inspection and cleaning. When no liquid is being fed to the cooler, the clamping sections, 16, 17 may be quickly removed by releasing the clamping screw 19 and by thereafter withdrawing the clamp sections. The cooling plates 10, 11 are then free to be swung apart as in Figs. 5 and 6, whereupon the grid 14 is freely removable and the internal passages and surfaces 12, 13 may then be thoroughly cleaned in an expeditious manner. The cooling unit may be just as readily restored to normal operating condition, thus providing a highly sanitary assemblage especially adapted for the safe and rapid cooling of commodities such as milk.

From the foregoing detailed description it will be apparent that my invention provides an improved system and apparatus for quickly and most effectively cooling milk promptly after it has been extracted from the producing animals, and without undue exposure of the commodity to the outside air before cooling has been effected. By causing the constantly advancing stream of milk to assume film like formation during the cooling operation, uniform and rapid cooling may be effected, and large capacity is obtainable with the aid of relatively compact cooling apparatus. The light but strong cooling unit may be readily transported from place to place, and all parts of this unit are also conveniently accessible for inspection and cleaning so that it may be maintained in sanitary condition at all times with minimum effort. The refrigeration unit may also be manufactured and operated at moderate cost, due to its simplicity and high efficiency, and while small operators may require only a single unit, larger operators may utilize several of the cooling units operating in conjunction with a common refrigerant circulating system. Any suitable type of refrigerant may be employed, and the internal construction of the cooling plates 10, 11 may be varied to suit conditions, but the use of the flat surfaces 12, 13 co-operating with an intervening grid 14 of any desired thickness serves the dual purpose of providing large cooling area while permitting effective cleaning. The improved system obviously facilitates the milking and cooling operations especially for the smaller operators or farmers, and insures the production of wholesome and sanitary product.

It should be understood that it is not desired to limit this invention to the exact details of construction of the apparatus, herein shown and described, for various modifications within the scope of the claims may occur to persons skilled in the art.

I claim:

1. In a portable liquid cooling unit, a pair of swingably connected cooling plates each having an extensive plane surface facing the corresponding surface of the other plate and each being provided with an internal cooling chamber adjoining its said surface, a hinge pin swingably connecting the corresponding sides of said plates, a relatively thin flat grid interposed between said plates and having an elongated circuitous conduit therein enclosed by said surfaces, a removable clamp having two U-shaped sections each spanning one of said plates and detachably interconnected with each other on opposite sides of the plates, one of said clamp sections having its medial portion provided with an abutment coacting with the central outer portion of one of said plates and the other having an adjustable clamping element coacting with its medial portion and with the central outer portion of the other plate, means for conducting liquid to said conduit through one of said plates and from the conduit through the other plate, and means for effecting circulation of cooling medium through said chambers.

2. In a portable liquid cooling unit, a pair of swingably connected cooling plates each having an extensive plane surface facing the corresponding surface of the other plate and each being provided with an internal cooling chamber adjoining its said surface, a hinge pin swingably connecting the corresponding sides of said plates, a relatively thin flat grid interposed between said plates and having an elongated circuitous conduit therein enclosed by said surfaces, a removable clamp having two U-shaped sections each spanning one of said plates and detachably interconnected with each other on opposite sides of the plates, means for conducting liquid to said conduit through one of said plates and from the conduit through the other plate, means for effecting circulation of cooling medium through said chambers, and means for effecting suspension of the cooling unit from an upright support through said hinge pin.

3. In a portable liquid cooling unit, a pair of swingably connected cooling plates each having an extensive plane surface facing the corresponding surface of the other plate and each being provided with an internal cooling chamber adjoining its said surface, a hinge pin swingably connecting the corresponding sides of said plates, a relatively thin flat grid interposed between said plates and having an elongated circuitous conduit therein enclosed by said surfaces, a removable clamp having two U-shaped sections each spanning one of said plates and detachably interconnected with each other on opposite sides of the plates, means for conducting liquid to said conduit through one of said plates and from the conduit through the other plate, and a pair of fittings suspended from said hinge pin and each swingable thereabout with one of said plates for effecting circulation of cooling medium through the chambers of their respective carrying plates.

ALBERT J. BLUM.

REFERENCES CITED

The following references are of record in the file of this patent:

UNITED STATES PATENTS

| Number | Name | Date |
|---|---|---|
| 1,915,516 | Carpenter | June 27, 1933 |
| 75,622 | Brownfield | Mar. 17, 1868 |
| 1,961,660 | Fehrmann | June 5, 1934 |
| 2,056,581 | Mortensen | Oct. 6, 1936 |
| 2,229,306 | Prestage | Jan. 21, 1941 |
| 2,348,020 | Norris | May 2, 1944 |
| 2,293,041 | Borden | Aug. 18, 1942 |
| 1,861,898 | Rosen-Baum et al. | June 7, 1932 |
| 712,529 | Henry | Nov. 4, 1902 |
| 175,397 | Weineis | Mar. 28, 1876 |
| 1,825,645 | Martin | Sept. 29, 1931 |
| 1,622,005 | Seligman | Mar. 22, 1927 |
| 1,754,857 | Harrison | Apr. 15, 1930 |
| 1,770,254 | Seligman | July 8, 1930 |
| 2,028,562 | Prestage | Jan. 21, 1936 |
| 2,379,671 | Wetherby-Williams | July 3, 1945 |